United States Patent
Choi et al.

(10) Patent No.: US 12,511,520 B1
(45) Date of Patent: Dec. 30, 2025

(54) METHOD AND SYSTEM FOR LATENCY REDUCTION IN SERIALIZED MACHINE LEARNING SYSTEMS

(71) Applicant: Moloco, Inc., Redwood City, CA (US)

(72) Inventors: Bokyung Choi, Redwood City, CA (US); Jian Gong Deng, Redwood City, CA (US); Donghwan Jeon, Bellevue, WA (US); Choonghwan Lee, Bellevue, WA (US); Sechan Oh, Redwood City, CA (US); Alexander Sareyan, Redwood City, CA (US)

(73) Assignee: Moloco, Inc., Redwood City, CA (US)

( * ) Notice: Subject to any disclaimer, the term of this patent is extended or adjusted under 35 U.S.C. 154(b) by 889 days.

(21) Appl. No.: 17/331,855

(22) Filed: May 27, 2021

Related U.S. Application Data

(60) Provisional application No. 63/033,594, filed on Jun. 2, 2020.

(51) Int. Cl.
    *G06N 3/045*    (2023.01)
    *G06N 3/047*    (2023.01)
    *G06N 20/20*    (2019.01)

(52) U.S. Cl.
    CPC .............. *G06N 3/045* (2023.01); *G06N 3/047* (2023.01); *G06N 20/20* (2019.01)

(58) Field of Classification Search
    CPC ......... G06N 3/045; G06N 20/20; G06N 3/047
    See application file for complete search history.

(56) References Cited

U.S. PATENT DOCUMENTS

| 10,176,484 | B2 | 1/2019 | Dilling et al. |
| 10,885,097 | B2* | 1/2021 | Terrazas ................. G06N 20/00 |

(Continued)

FOREIGN PATENT DOCUMENTS

| WO | WO-2017218937 A1 | 12/2017 |
| WO | WO-2019235636 A1 | 12/2019 |

OTHER PUBLICATIONS

Roy et al., "BrainTorrent: A Peer-to-Peer Environment for Decentralized Federated Learning," May 16, 2019, pp. 1-9. (Year: 2019).*

(Continued)

*Primary Examiner* — Kyle R Stork
(74) *Attorney, Agent, or Firm* — Wilson Sonsini Goodrich & Rosati

(57) ABSTRACT

The present disclosure provides methods for reducing prediction latency. The method comprises: (a) receiving, at a first computing system, a service request including feature data for performing a prediction; (b) the first computing system making a first intermediary prediction using a first machine learning model based on a first set of data and the feature data; (c) concurrent with (b) a second computing system making a second intermediary prediction using a second machine learning model in response to a prediction request received from the first computing system, and the second intermediary prediction is generated based on a second set of data and feature data included in the prediction request; (d) making an enhanced prediction by the first computing system based on the first intermediary prediction and the second intermediary prediction, and the second set of data and the second machine learning model are inaccessible to the first computing system.

18 Claims, 8 Drawing Sheets

(56) References Cited

U.S. PATENT DOCUMENTS

| | | | | |
|---|---|---|---|---|
| 11,093,818 B2* | 8/2021 | Li | ............ | G06N 3/044 |
| 2008/0069456 A1 | 3/2008 | Perronnin | | |
| 2018/0322606 A1 | 11/2018 | Das et al. | | |
| 2020/0358611 A1* | 11/2020 | Hoang | ............ | H04L 9/3231 |
| 2021/0186409 A1* | 6/2021 | Lee | ............ | A61B 5/055 |
| 2021/0350930 A1* | 11/2021 | Baron | ............ | G06N 5/01 |

OTHER PUBLICATIONS

Crankshaw, Daniel. The design and implementation of low-latency prediction serving systems. EECS Department, University of California, Berkeley, 2019; http://www2.eecs.berkeley.edu/Pubs/TechRpts/2019/EECS-2019-171.html.

Crankshaw, et al., Clipper: a low-latency online prediction serving system. arXiv:1612.03079 [cs.DC] Feb. 28, 2017.

Shokri, et al., Privacy-preserving deep learning. CCS'15, Oct. 12-16, 2015; doi: http://dx.doi.org/10/1145/2810103.2813687.

* cited by examiner

METHOD AND SYSTEM FOR LATENCY REDUCTION IN SERIALIZED MACHINE LEARNING SYSTEMS

CROSS-REFERENCE TO RELATED APPLICATIONS

This application claims the priority and benefit of U.S. Provisional Application No. 63/033,594 filed on Jun. 2, 2020, the entire contents of which is incorporated herein by reference.

BACKGROUND

With the recent growth of highly accessible and cost-effective machine learning platforms (e.g., TensorFlow, Amazon's Machine Learning, Microsoft's Azure Machine Learning, OpenAI, SciKit-Learn, Matlab, etc.), users have numerous off-the-shelf options available to them for conducting automated analysis of large data sets. Machine learning service providers usually collect user data on a large scale since the success of deep learning techniques is directly proportional to the amount of data available for training. However such massive data collection and/or serving machine learning models suffer from privacy issues.

Furthermore, applications such as recommendation services, virtual assistants, online advertising and the like require low-latency prediction services. For instance, real-time bidding (RTB) for mobile advertising requires a bid to be submitted to Ad exchange within a short timeframe (e.g., <100 ms).

SUMMARY

The present disclosure provides methods and systems allowing individuals/consumers to build, develop and implement machine learning models capable of generating predictions using both in-the-field data and data transferred from another model (provider model) while having the in-the-field data, local model and provider model remain private and secured. Methods and systems are provided that may achieve improvements to a machine learning model using another base/provider machine learning model while keeping the local input data and model contents isolated in multiple (e.g., two or more) separate systems. However, during an inference stage (i.e., a stage at which a model makes predictions) of the present serialized machine learning systems, a consumer system may receive model output generated by a provider model and join the model output with local consumer data through the integration point such that the consumer model may make enhanced predictions. Such serialized machine learning systems may result in an increased prediction latency caused by the overall time to complete one prediction (prediction latency) is the sum of the provider model prediction time and the consumer model prediction time. It is desirable to provide a low-latency prediction serving system while preserving the privacy protection.

In particular, in an inference stage, the present disclosure provides methods to improve the inference speed or reduce prediction latency allowing for a prediction serving system with low latencies, improved accuracy and privacy protection.

In an aspect, a method for reducing prediction latency in a serialized machine learning system is provided. The method comprises: (a) a first computing system making a first intermediary prediction using a first machine learning model based on (i) a first set of data accessible to the first computing system and (ii) data in a request; (b) concurrently with (a), a second computing system making a second intermediary prediction using a second machine learning model, wherein the second intermediary prediction is generated based on (i) a second set of data accessible to the second computing system and (ii) the data in the request; and (b) making an enhanced prediction based on the first intermediary prediction and the second intermediary prediction by the first computing system or the second computing system.

In some embodiments, the request is for performing a prediction and wherein the request is received by the first computing system. In some embodiments, the second computing system makes the second intermediary prediction in response to a prediction request received from the first computing system, and wherein the prediction request includes the data. In some embodiments, the second set of data and the second machine learning model are inaccessible to the first computing system. In some embodiments, the first set of data and the first machine learning model are inaccessible to the second computing system.

In some embodiments, the second machine learning model is trained using supervised learning and a labeled dataset for training the second machine learning model comprises model output data generated by the first machine learning model. In some cases, the first machine learning model is a neural network. In some instances, the model output data generate by the first machine learning comprises output of a top layer of the neural network. In some instances, the model output data generate by the first machine learning comprises a prediction value. In some embodiments, a model output function of the first machine learning model or the second machine learning model is a simple arithmetic transformation.

In another aspect, the disclosure provides a serialized machine learning system. The system comprises: a first computing system comprising a first machine learning model, wherein the first computing system is configured to make a first intermediary prediction using the first machine learning model based on (i) a first set of data accessible to the first computing system and (ii) data in a request; a second computing system comprising a second machine learning model, wherein the second computing system is configured to make a second intermediary prediction concurrently with the first computing system making the first intermediary prediction, and wherein the second intermediary prediction is made using the second machine learning model based on (i) a second set of data accessible to the second computing system and (ii) the data in the request. In some embodiments, the first machine learning model or the second machine learning model generates an enhanced prediction based on the first intermediary prediction and the second intermediary prediction.

In some embodiments, the request is for performing a prediction and wherein the request is received by the first computing system. In some embodiments, the first computing system is configured to further send a prediction request to the second computing system, and wherein the second computing system makes the second intermediary prediction in response to receiving the prediction request. In some embodiments, the second set of data and the second machine learning model are inaccessible to the first computing system.

In some embodiments, the first set of data and the first machine learning model are inaccessible to the second computing system. In some embodiments, the second machine learning model is trained using supervised learning and a labeled dataset for training the second machine learning model comprises model output data generated by the first machine learning model. In some cases, the first machine learning model is a neural network. In some instances, the model output data generate by the first machine learning comprises output of a top layer of the neural network. Alternatively or additionally, the model output data generate by the first machine learning comprises a prediction value. In some embodiments, a model output function of the first machine learning model or the second machine learning model is a simple arithmetic transformation.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
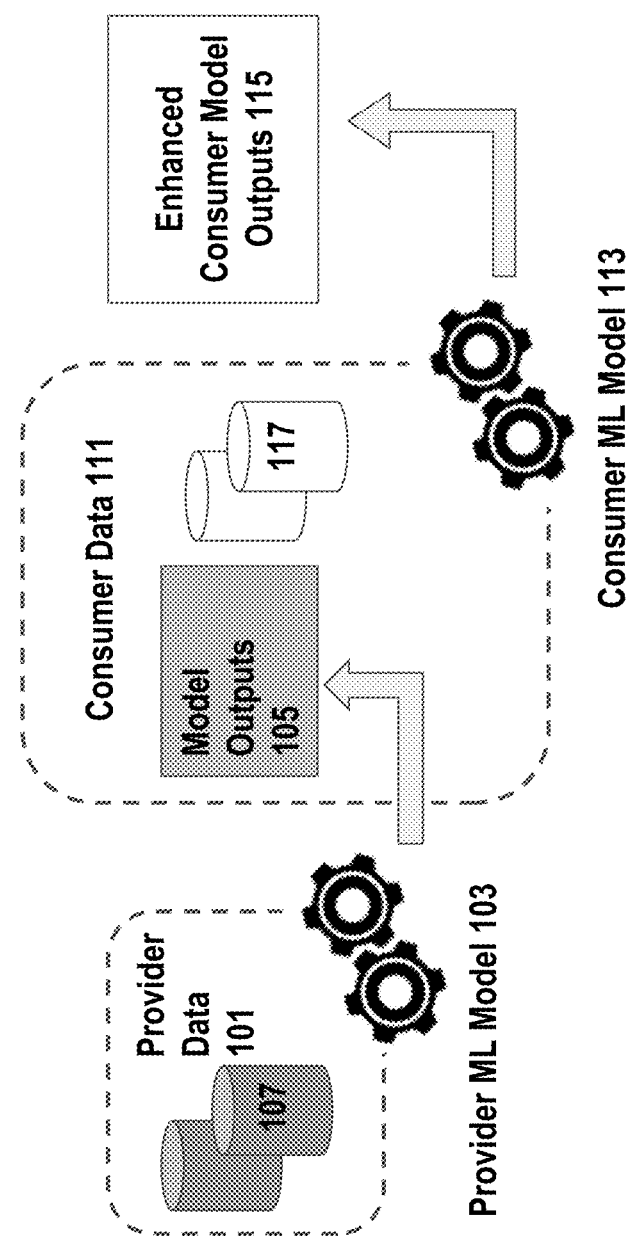
FIG. 1 schematically shows a method of leveraging data between a provider system and a consumer system, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The invention provides systems and methods for improving a machine learning model using another base machine learning model while remaining the input data and model contents isolated in the respective separate systems. In particular, a secure and protected system architecture is provided that can achieve improvements to a consumer machine learning model by using machine learning model output from a provider as input to the consumer machine learning model. The datasets and models remain isolated, private and secured with the respective consumer and provider systems. The provided method allows for leveraging the consumer and provider datasets without sharing the data with the consumer or provider systems during production. The provided methods and systems allow the consumer and provider systems work in an isolated manner with a loose connection (e.g., an integration point). The provider and consumer model contents and datasets may remain isolated throughout training, development, validation, productionalization and deployment of the consumer model. The provided methods and systems can be applied in various scenarios such as in cloud or an on-premises environment.

In some cases, during an inference stage (i.e., a stage at which a model makes predictions), a consumer system may receive model output generated by a provider model and join the model output with local consumer data through the integration point such that the consumer model may make enhanced predictions. However, the serialized machine learning systems may result in an increased prediction latency caused by the overall time to complete one prediction (prediction latency) is the sum of the provider model prediction time and the consumer model prediction time. In some embodiments of present disclosure, a method is provided for reducing the prediction latency. For instance, a partial prediction may be performed by the provider model and consumer model in parallel or concurrently such that the overall prediction time may be reduced. Details about the method and the prediction serving system are described later herein.

Various aspects of the invention described herein may be applied to any of the particular applications set forth below. The invention may be implemented as providing machine learning predictions as a service. It shall be understood that different aspects of the invention can be appreciated individually, collectively or in combination with each other.

The term "provider" as utilized herein, generally refers to a party, entity or company that provides a machine learning model output. The machine learning output may be provided to another system for a second machine learning prediction. In some cases, the provider may be the owner of the machine learning model that generates the output to be provided to another system. The machine learning output may be provided to another system for training a second machine learning model during a training phase and/or for making predictions after deployment of the second machine learning model.

The term "consumer" as utilized herein, generally refers to a party, entity or company that is benefiting from the provider system's machine learning output. The consumer may use the provider system's machine learning output to improve its own machine learning models. In some cases, the consumer may be the owner of the machine learning model that uses the output generated by another machine learning model. For example, the consumer may receive and use the output provided by a provider system for training the consumer's machine learning model during a training phase, and/or for making predictions in a production phase or after deployment of the model.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Training datasets can be limited and rare. As mentioned above, the performance of machine learning models may be limited by the amount of the training datasets. Methods and systems of the present disclosure may improve the accuracy, quality and performance of the consumer machine learning model by augmenting the input features sets for training with output (e.g., prediction, score) from the provider machine learning model. In some cases, the output generated by the provider system may be joined with selected input features of local/private data to form an optimal input features set for training the consumer model. The performance of the consumer model may be improved over the performance of the model that uses the local data alone or the performance of the provider model.

Utilizing the model output generated by the provider model beneficially allows both the consumer system and provider system to keep their own datasets private, isolated and secured. The consumer system and provider system are secured and private. For example, data, model design, model weights, or code on consumer system and provider system are not visible or inaccessible to one another.

The security and privacy may be maintained throughout training, development, validation, productionalization and deployment of the consumer machine learning model. At model production time or prediction time, the consumer system may make predictions by taking both the output generated by the provider model and the consumer local data as input. Similarly to the training phase, the data, model design, model weights, or code may be kept isolated and secured on the consumer system and provider system separately.

Model output may be passed from the provider system to the consumer system through an integration point. An integration point may automatically integrate model outputs from the provider system as part of the input features (of training data) to train the consumer machine learning model. The integration point may also automatically integrate model outputs transferred from the provider system as part of the input features to the consumer model for making predictions during inference or prediction phase. This beneficially allows for serving machine learning model output in an adaptive and universal manner without exposing the provider's data or model content. The integration point can be one directional that is configured to pass model outputs from the provider machine learning model to the consumer machine learning model. The integration point can be implemented as one or more computer programs, i.e., one or more modules of computer program instructions, encoded on computer storage medium for execution by, or to control the operation of, data processing apparatus.

The integration point may be employed in the inference phase or prediction phase to facilitate a low-latency prediction serving system. In some cases, the integration point May automatically integrate partial model outputs generated by the consumer model system as part of the input features to the provider model for making a final prediction. Alternatively, the integration point may automatically integrate partial model outputs generated by the provider model system as part of the input features to the consumer model for making a final prediction. Details about the integration point implemented in the inference phase are described later herein.

As described above, model output may be transmitted from the provider system to the consumer system during a training phase. In some cases, the model output passed from the provider system to the consumer system may include, for example, probability scores, top (i.e., logit) layer outputs of a neural network, or a combination of both. In some cases, the data may also include provider input features. For example, the provider input features and corresponding predictions generated by the provider machine learning model may form paired dataset. The paired dataset may be transferred to the consumer system for supervised learning.

The model output such as a core value, or predicted value, can be provided in many different formats depending on the provider machine learning model design and the input data types of the provider machine learning model. For example, for classification models, the model outputs may include a predicted value for the class, as well as the probability of the predicted value; for regression models, the model outputs may include the predicted numeric value; for image classification models, the model output may include the class of object in the image, or a Boolean indicating whether a particular feature was found.

Serialized Machine Learning Systems and Methods

FIG. 1 schematically shows a method of leveraging data between a provider system and a consumer system, in accordance with some embodiments of the invention. The method may be applied to a training phase. For instance, model outputs 105 generated by the provider machine learning model 103 may be passed to the consumer system to be used in conjunction with the consumer data 111 as input features to train the consumer machine learning model 113 or to make predictions after deployment of the consumer machine learning model 113. The performance, accuracy or quality of the consumer machine learning model 113 may be improved such that enhanced model output can be generated 115. The provider data 101 and consumer data 111 may remain isolated and secured on the provider system and consumer system respectively, throughout training, development, validation, productionalization and deployment of the consumer machine learning model.

This is an improvement over the conventional training methods that fail to preserve privacy. For example, in the conventional federated learning, a central system and distributed devices share a common model, the central model is visible and exposed to the distributed devices, and the updated model from each device is also exposed to the central system. As another example, in the conventional transfer learning, a base network is trained on a base dataset and task first, and then the learned features are repurposed, or transferred to a second target network to be trained on a target dataset and task. However, in such transfer learning, the features are required to be general, suitable to both base and target tasks, instead of specific to the base task, and the base model is also exposed and visible to the second network. Systems of the present disclosure provides improved privacy preservation capability without comprising performance. Systems of the present disclosure allows individuals/consumers to build, develop and implement machine learning models capable of generating predictions using both in-the-field data and data transferred from another model (provider model) while having the in-the-field data, local model and provider model remain private and secured.

The provider data 101 may be stored in a data storage unit 107 (or data repository) that is accessible to the provider system. The data storage unit 107 may be inaccessible to the consumer system. The data repository 107 may be a local storage repository or a cloud storage for storing the provider data. The provider data may include training dataset for training the provider machine learning model (e.g., feature vector, labeled data, etc), model design (e.g., model architecture), model weights (e.g., hyper parameters, weights of the provider machine learning model), input data and output data of a component of the provider model system, historical data, code associated with the provider system and various other data as described elsewhere herein.

Similarly, the consumer data 111 may be stored in a data storage unit 117 (or data repository) that is accessible to the consumer system. The data storage unit 117 may not be accessible or may be inaccessible to the provider system. The data repository 117 may be a local storage repository or a cloud storage for storing the consumer data. The consumer data may include local or private data, training dataset for training the consumer machine learning model (e.g., feature vector, labeled data, output data from the provider system, etc), model design (e.g., model architecture), model weights (e.g., hyper parameters, weights of the consumer machine learning model, etc), input data and output data of a component of the consumer model system, historical data (e.g., in-the-field data, prediction results, evaluation data, performance metrics, etc), parameters for training the consumer machine learning model (e.g., threshold for performance metrics, etc), code associated with the consumer system and various other data as described elsewhere herein.

The model output 105 passed from the provider system to the consumer system may include, for example, probability scores, top (e.g., logit) layer outputs of a neural network, or a combination of both. In some cases, the model output 105 may also include provider system input features. Such provider input features may be used for training the consumer machine learning model. For example, the provider input features may include ground-truth data (e.g., labeled data) which may be used as labeled data or input features for training the consumer machine learning model. In such case, the labeled data along with the model output may be transferred to the consumer system for supervised learning. The model output such as score, or predicted value, can be in many different formats depending on the provider machine learning model design and the input data types of the provider machine learning model. For example, for classification models, the model outputs may include a predicted value for the class, as well as the probability of the predicted value; for regression models, the model outputs may include the predicted numeric value; for image classification models, the model output may include the class of object in the image, or a Boolean indicating whether a particular feature was found.

Figure 2:
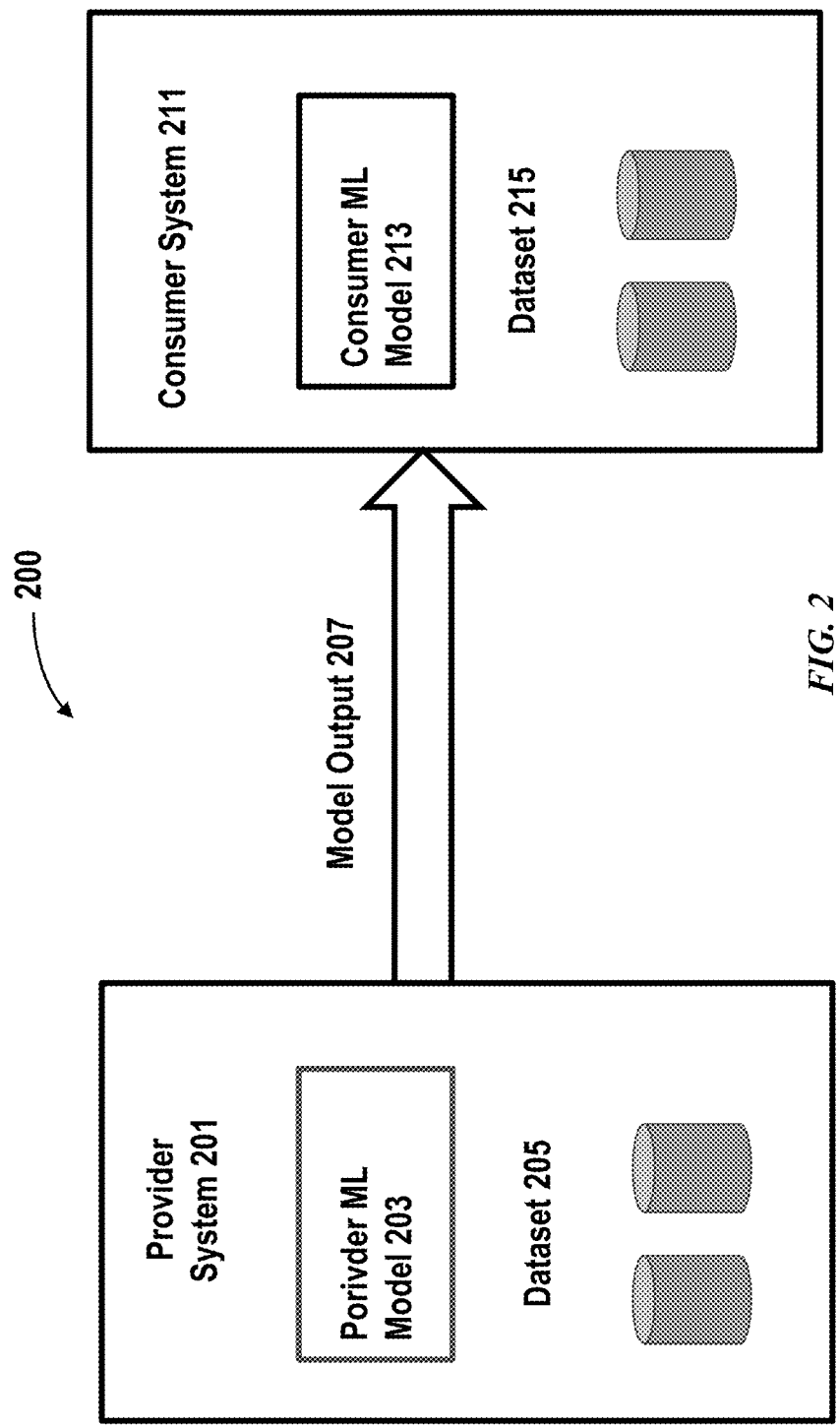
FIG. 2 schematically shows a serialized machine learning system 200, in accordance with embodiments of the present disclosure.

FIG. 2 schematically shows a serialized machine learning system 200, in accordance with embodiments of the invention. In some embodiments, the serialized machine learning system 200 may comprise one or more provider systems 201 and one or more consumer systems 211. The model outputs 207 generated by the one or more provider systems 201 may be passed from the one or more provider systems 201 to the one or more consumer systems 211 via an integration point. In some cases, the integration point may also allow for partial predictions output generated by the consumer system to be transmitted to the provider system during a prediction phase.

During a training phase, the integration point may automatically integrate model outputs 207 with the consumer dataset 215 as input features to train the consumer machine learning model 213. The integration point can be one directional. The integration point may be configured to pass model outputs from the provider system 201 to the consumer system 211. The integration point may be implemented in software, hardware, firmware, embedded hardware, stand-alone hardware, application specific-hardware, or any combination of these. The integration point may be provided on the provider system, the consumer system or both. The integration point may function as a loose connection between the provider system 201 and the consumer system 211 such that the provider data 205 and consumer data 215 remain isolated and secured on the provider system and consumer system respectively. Information such as data (e.g., consumer data, provider data), model design (e.g., model architecture), model weights (e.g., weights of the consumer machine learning model, weights of the provider machine learning model), and code associated with the provider and consumer are invisible to one another.

The integration point may be configured to join the output data or training sample data provided by the provider system with the local data of the consumer system. In some cases, the data provided by the provider system and the local data of the consumer system may be joined by certain common features such as common feature identifiers (IDs). This beneficially allows for serving machine learning model output in an adaptive and universal manner without exposing the provider's data or model content and vice versa. The integration point may adaptively integrate the model output from the provider system to the local data of the consumer system regardless the architecture or type of the underlying machine learning models/algorithms. For instance, in mobile advertising applications, common feature IDs such as mobile device advertising (Ad) ID and publisher name may be used for joining the consumer private data and the training sample data provided by the provider system. For example, in click-through rate (ctr) prediction, one sample dataset transferred from the provider system may comprise: (i) mobile device Ad ID, (ii) name of the publisher where the Ad impression was made (iii) provider model's predicted ctr and (iv) a conversion result (e.g., user clicked or not, user signed up at the landing web page or not, etc.). In some cases, for each sample dataset, the consumer system or the integration point may append private features that are from the consumer private/local data (e.g., the products that each mobile Ad ID are purchased from, an e-commerce app using the mobile Ad IDs) to create the consumer's training dataset. For example, the private feature and the (iii) provider model's predicted ctr may form the input features, and the (iv) conversion result transferred from the provider system may be used as the labeled data to train the consumer machine learning model. The integration point is further configured to facilitate low-latency prediction. Details about methods and components for low-latency prediction are described later herein.

The provider machine learning model 203 and the consumer machine learning model 213 may not have the same objective. For example, the consumer machine learning model may be trained to predict the probabilities of target conversions such as Ad click, product purchase, and application install while the provider machine learning model may make predictions such as click through rate (ctr) and purchase rate. For instance, the provider machine learning model may predict ctr while the consumer machine learning model may predict app install probability. In this case, the private or local data that is accessible to the consumer system and inaccessible to the provider system may include at least the app install label (e.g., user installed the advertised app or not). Alternatively or additionally, the provider machine learning model 203 and the consumer machine learning model 213 may have the same objective. For example, both the provider machine learning model and consumer machine learning model may predict the click-through-rate using click label (e.g., user clicked or not) and the prediction performance (e.g., accuracy) may be improved by utilizing both the private data and provider data.

The provider machine learning model 203 and the consumer machine learning model 213 may or may not have the same architecture, parameters or other model design parameters. The data (e.g., machine learning model output) provided by the provider machine learning model 203 can be used by the consumer machine learning model 213 in a universal manner regardless of the architecture, type, or contents of the respective machine learning models. For example, the provider machine learning model 203 may have CNN architecture while the consumer machine learning model 213 may have random forest architecture. In another example, the provider machine learning model 203 may be trained using unsupervised learning techniques while the consumer machine learning model 213 may be trained using supervised learning techniques.

Figure 3:
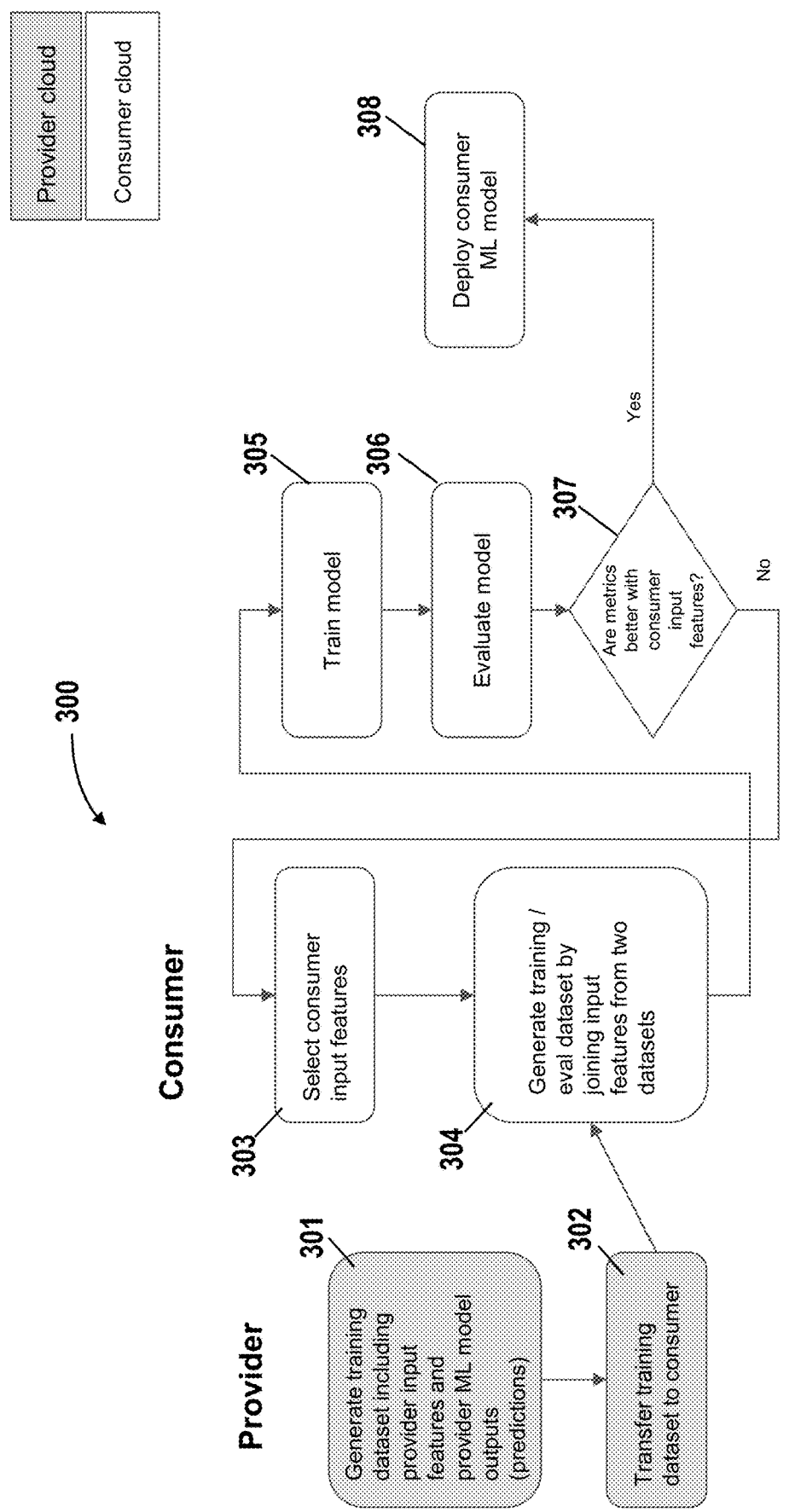
FIG. 3 shows an example of a training process performed in the serialized machine learning system as provided herein.

FIG. 3 shows an example of a training process 300 performed in the serialized machine learning system as provided herein. The provider system may be configured to generate data to be transferred to the consumer system for training the consumer machine learning model (operation 301). In some cases, the data to be transferred may comprise provider machine learning model outputs. In some cases, the data may include both the provider input features and the model outputs generated by the provider machine learning model. For example, the provider input features and corresponding predictions may form paired dataset and the paired dataset may be transferred to the consumer system for supervised learning. In some case, the output generated by the provider machine learning model may be used as labeled data for supervised learning. In some cases, the labeled data of the provider's training dataset may be used as the labeled data for training the consumer machine learning model. Alternatively, data provided by the provider machine learning model may not include labeled data and the data may be used for generating input features for the consumer machine learning model. In some cases, the data transferred to the consumer system may include the outputs of the top (e.g., logit) layer of the provider's neural network. In the case of a neural network architecture, the output vector of neurons in layer k of a K-level neural network can be defined as $a\_k=f\_k(W\_k'a\_\{k-1\})$, where $f\_k(\bullet)$ is an activation function for layer k, $W\_k$ is a matrix of model weights, and $a\_0$ is the input layer (encoded input features). The provider model's output, i.e., final prediction (e.g., predicted ctr) is then computed as sigmoid $(a\_K' w\_K)$, where $w\_K$ is the weight vector for the top layer. In the example, the top layer's outputs $a\_K$ instead of/or in addition to the predicted ctr may be transferred to the consumer system.

In some cases, the data to be transferred to the consumer system may be generated in response to receiving a service request. The service request may indicate desired model output or data to be transferred. In some cases, the service request may comprise information about the destination where the model output to be sent (e.g., the consumer system ID/address, consumer machine learning model ID, etc), the purpose of request (e.g., for training model, for making predictions), type of requested data (e.g., model output, features such as mobile device advertising (Ad) ID and publisher name for joining data), the amount of datasets (e.g., volume of data to be transferred) and others.

Next, the data may be transferred to the consumer system to be used for generating training dataset for training the consumer machine learning model (operation 302). The data may be transferred periodically or in an on-demand fashion. For example, the data may be transferred upon receiving an instruction requesting the provider system to provide data to the consumer system.

The data transferred from the provider system may be joined with consumer private data to form training dataset or evaluation dataset (operation 304). The training dataset and/or evaluation dataset for training the consumer machine learning model may comprise input features from both the transferred data (provider) and consumer input features. As described elsewhere herein, in some case, at least a portion of the data provided by the provider machine learning model may be used as labeled data for training the consumer model (e.g., supervised learning). Alternatively, data provided by the provider machine learning model may not include labeled data and the transferred data may be used for generating input features for the consumer machine learning model.

The consumer input features to be joined with the transferred data may be selected from a plurality of input features (operation 303). In some cases, the consumer data may be pre-processed to extract a plurality of input features such as the products that each mobile Ad ID are purchased from, an e-commerce app using the mobile Ad IDs and the like. The training dataset or evaluation dataset may also comprise labeled data that is from the consumer private data such as website conversions (e.g., advertising click, product purchase, and application install, etc.). In some cases, an initial set of one or more consumer input features may be selected. If the performance of the consumer machine learning model is not sufficient (e.g., performance does not pass a threshold), a different set of consumer input features may be selected for combining with the transferred data to generate a new training dataset. The process may be repeated until the model evaluation is improved over the base evaluation that an optimal set of input features may be determined.

The training dataset may be created by joining the data provided by the provider system with the selected consumer input features. In some cases, these data may be joined by common feature identifiers (IDs). For instance, common feature IDs such as mobile device advertising (Ad) ID and publisher name may be used for joining the consumer input features data and the training sample data provided by the provider system. For example, in click-through rate (ctr) prediction, one sample dataset transferred from the provider system may comprise: (i) mobile device Ad ID, (ii) name of the publisher where the Ad impression was made (iii) provider model's predicted ctr and (iv) a conversion result (e.g., user clicked or not, website conversion rate, etc). In some cases, for each sample dataset, the selected consumer input features (e.g., the products that each mobile Ad ID are purchased from, an e-commerce app using the mobile Ad IDs) may be appended to the sample dataset to create the consumer's training dataset. For example, the private feature and the (iii) provider model's predicted ctr may form the input features, and the (iv) conversion result transferred from the provider system may be used as the labeled data to train the consumer machine learning model.

During the training process (operation 305), the model may be evaluated (operation 306) and one or more performance metrics may be calculated. In some cases, the evaluation may be compared with a base evaluation or a threshold (provider models evaluation) to determine if the performance is sufficient (operation 307). Any suitable metrics can be selected for as performance metrics for evaluation. The metrics may be selected based on the model and data type, purpose, application and the like. For example, if the input data include image data, the evaluation metrics may include, but not limited to, Peak-Signal-to-Noise-Ratio (PSNR), normalized Root-Mean-Squared-Error (RMSE), Structural Similarity Index (SSIM), softmax cross entropy and others.

In some cases, a performance metric may be calculated and compared against a threshold (operation 307). For example, the performance metric of trained classifier may be the softmax cross entropy and the threshold may be the softmax cross entropy of the classifier of the provider system. The threshold values can be a fixed value, predefined threshold or dynamically determined.

If the model evaluation is better than the base evaluation or if the performance of the trained model passes the threshold, the trained model may be deployed for prediction (operation 408). If the model evaluation is not better than the base evaluation, a different set of consumer input features may be selected for combining with the transferred data to generate a new training dataset. The process may be repeated (e.g., operations 403-407 are repeated) until the model evaluation is improved over the base evaluation.

The input features for training the consumer machine learning model may be updated continuously. For instance, the provider system may continuously generate model outputs and pass the outputs to the consumer system. In some cases, the input features being used during the training process conducted on the consumer system may be updated periodically. Alternatively or additionally, the model outputs may be passed to the consumer system in an on-demand fashion.

Although FIG. 3 shows a method in accordance with some embodiments, a person of ordinary skill in the art will recognize that there are many adaptations for various embodiments. For example, the operations can be performed in any order. Some of the operations may be precluded, some of the operations may be performed concurrently in one step, some of the operations may be repeated, and some of the operations may comprise sub-steps of other operations. For example, unsupervised learning or semi-supervised learning may be used for training the provider machine learning model and/or the consumer machine learning model. In such case, the training process may require little labeled data. The method may also be modified in accordance with other aspects of the disclosure as provided herein.

Figure 4:
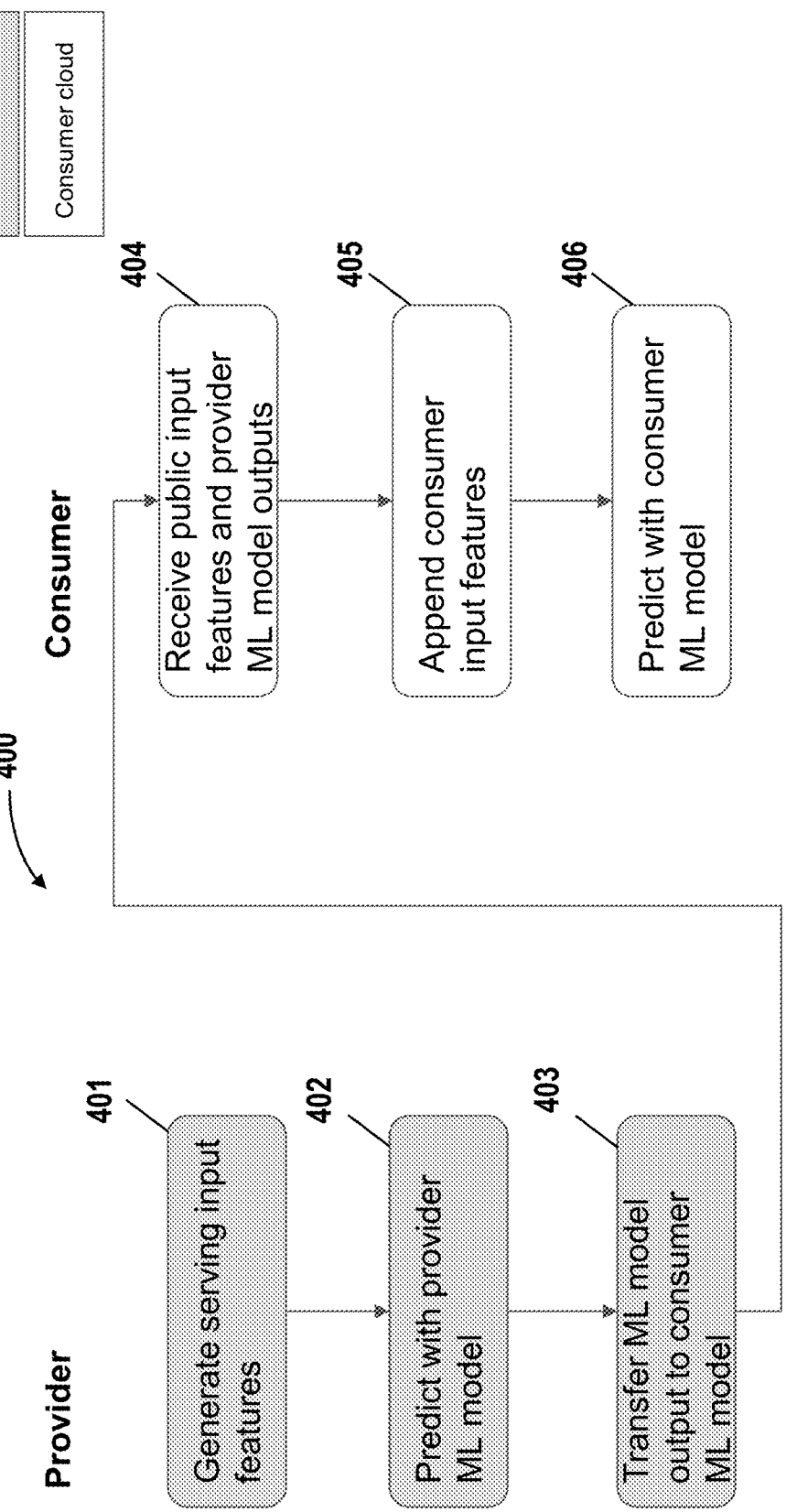
FIG. 4 shows an example of a serialized prediction process for serialized machine learning model systems.

FIG. 4 shows an example of a serialized prediction process 400 for serialized machine learning model systems. The consumer model may make predictions based on data provided by the provider system and consumer private data. However, the prediction process may result in an increase in the overall time to complete one prediction (prediction latency) as the sum of the time for provider model prediction and the time for consumer model prediction.

As illustrated in the exemplary process, the provider system may generate input features to be served to a consumer system in response to a service request (operation 401). The service request may indicate desired model output. In some cases, the service request may comprise information about the destination where the model output to be sent (e.g., the consumer system ID, consumer machine learning model ID, etc), the purpose of request (e.g., for training model, for making predictions), type of requested data (e.g., model output, top layer outputs, provider input features, features such as mobile device advertising (Ad) ID and publisher name for joining data), and others. The provider may generate predictions using the provider machine learning model (operation 402). In some cases, the prediction may be generated based on the provider data that is in accessible to the consumer system. The provider machine learning model output (e.g., predictions) may then be passed to the consumer system (operation 403). The consumer system may receive the data transmitted from the provider system along with public input features such as common feature IDs (operation 404). Next, the consumer system may append the consumer input features to the data received in operation 404 (operation 404) and generate predictions using the consumer machine learning model (operation 405).

In the illustrated example, the prediction latency may be the sum of the prediction latency of both the provider system and the consumer system. This may not be suitable for applications such as recommendation services, virtual assistants, online advertisers and the like that require low-latency prediction service. For instance, real-time bidding (RTB) for mobile advertising requires a bid to be submitted to Ad exchange within a short timeframe (e.g., <100 ms). The present disclosure provides methods and systems for prediction serving with reduced latency.

Latency Reduction Methods and Systems

During a training process, the weights or parameters of a model are tuned to approximate the ground truth data thereby learning a model output function. In some cases, when the consumer/provider model output function meets certain conditions, the overall prediction latency may be reduced by implementing a novel method such that the overall prediction latency is approximately the maximum of the provider model prediction latency and consumer model prediction latency.

Assume the provider model prediction output is m, the consumer model prediction output is p, the consumer input feature is $z$, then the consumer/provider model output function is $F(m, z)=\theta(G(z), \phi(m))$. The consumer/provider model output function may meet below three conditions: (1) ø (•) is a simple arithmetic transformation such as logarithmic or exponential, (2) $\phi$(•) may include a relatively small number of basic numeric computations such as addition and multiplication and (3) the computational time for $\theta$(•) and $\phi$(•) is negligible compared to G(•), wherein G(•) is the function for making an intermediary prediction. For example, the function may be $F(m, z)$=sigmoid (f($z$)+g($z$)*logit (m)), where g(•) or f(•) may be linear, deep neural network, or any other ML model output functions. Note that sigmoid $(x)=1/(1+\exp(-x))$ and logit $(p)=\log(p/(1-p))$ $=$sigmoid$^{-1}$(p).

Figure 5A:
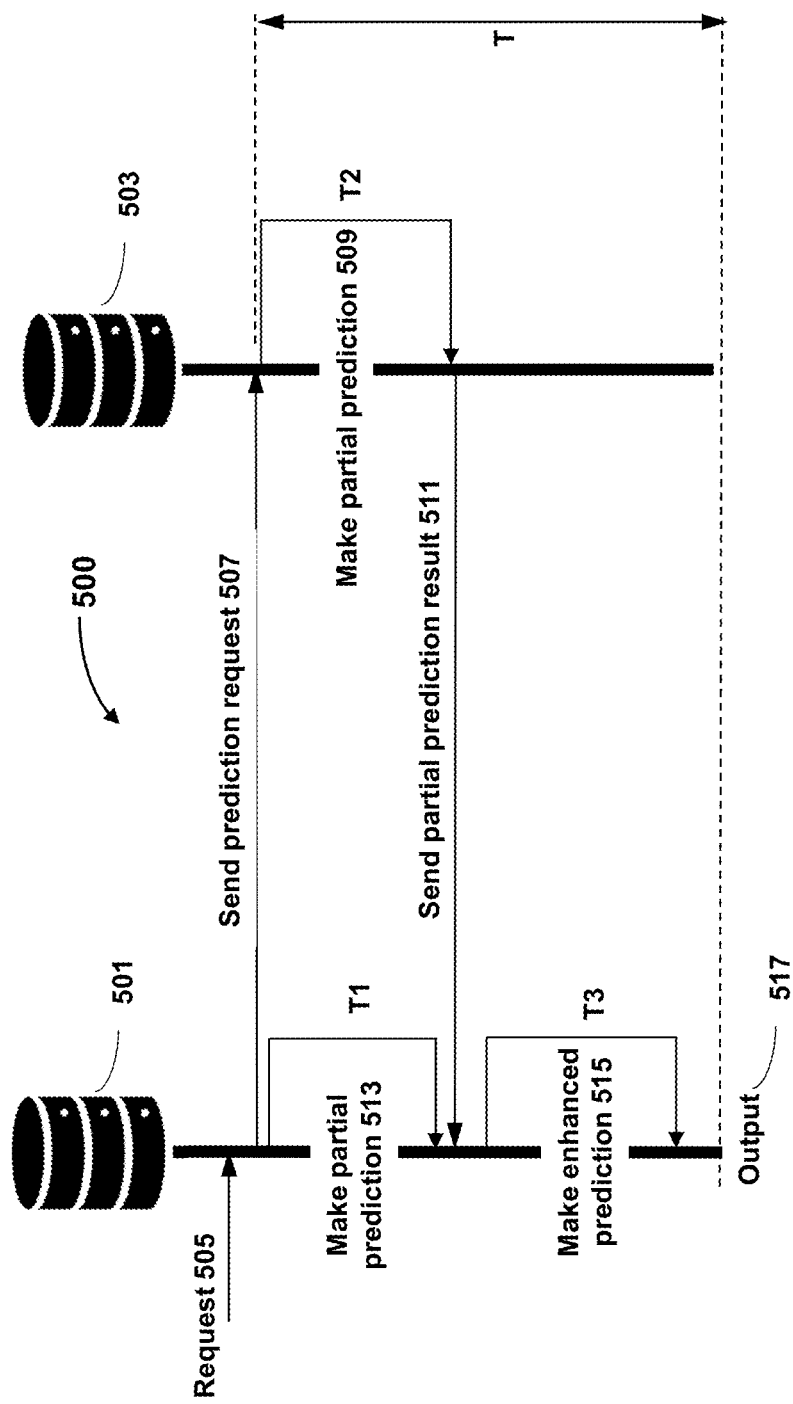
FIG. 5A and FIG. 5B illustrate exemplary processes of making a prediction with reduced latency, in accordance with some embodiments of the present disclosure.

FIG. 5A illustrates an exemplary process 500 of making prediction with reduced latency, in accordance with some embodiments of the present disclosure. The process may begin with receiving a service request 505 at the provider system 501. The service request may be any service request for making a prediction. For example, the service may be an Ad impression bid request (impression opportunity) for advertising cloud clients' campaigns. The bid request may include information about a user and advertising inventory such as the user's advertising ID, user's geo location, publisher name, and advertising creative format. Upon receiving the service request, the provider system 501 may send a prediction request 507 to the consumer system 503. The prediction request may include key attributes or features data of the service request such as the bid ID, user ad ID, advertising inventory ID, user location, and publisher name.

In response to receiving the prediction request, the consumer system 503 may make an intermediate prediction or partial prediction 509 using the consumer private data z and features data included in the prediction request (e.g., user ad ID, publisher name, etc.). The consumer system 503 may send the partial prediction result G($z$) to the provider system 511. Concurrently with the consumer system making the partial prediction, the provider system 501 may generate a prediction output m. The prediction output may be generated based on the provider data and features data from the bid request. For example, the provider system 501 may estimate click probability or app installation probability, for a single advertising campaign (single prediction), or multiple advertising campaigns (batch prediction) using (i) the features data from the bid request and (ii) provider's user data.

Upon receiving the partial prediction result G($z$) and completion of generating the prediction output m, the provider system may perform an enhanced prediction 515 to output a final prediction output F(m, $z$) 517. The final output may be generated based on the partial prediction result G(z) received from the consumer system and the prediction output m.

The overall prediction time T may approximate the provider model prediction time (provider model prediction time=Max (T1, T2)+T3). The overall prediction time can be shorter than the sum of the provider model prediction time and consumer model prediction time (e.g., provider model prediction time+consumer model prediction time) as illustrated in FIG. 5A given that T3 is negligible compared to T1 and T2 when the model function meets the above-mentioned conditions. By running the partial prediction concurrently, the overall prediction time T is significantly shorter than running the predictions serially (i.e., provider model predicts first then pass the model output to the consumer model to make prediction). It should be noted that given the different complexities of the models used by the provider system and the consumer system, the provider model prediction time T1 and consumer model prediction time T2 may or may not be the same. The enhanced prediction may be performed by the provider system or the consumer system.

Figure 5B:
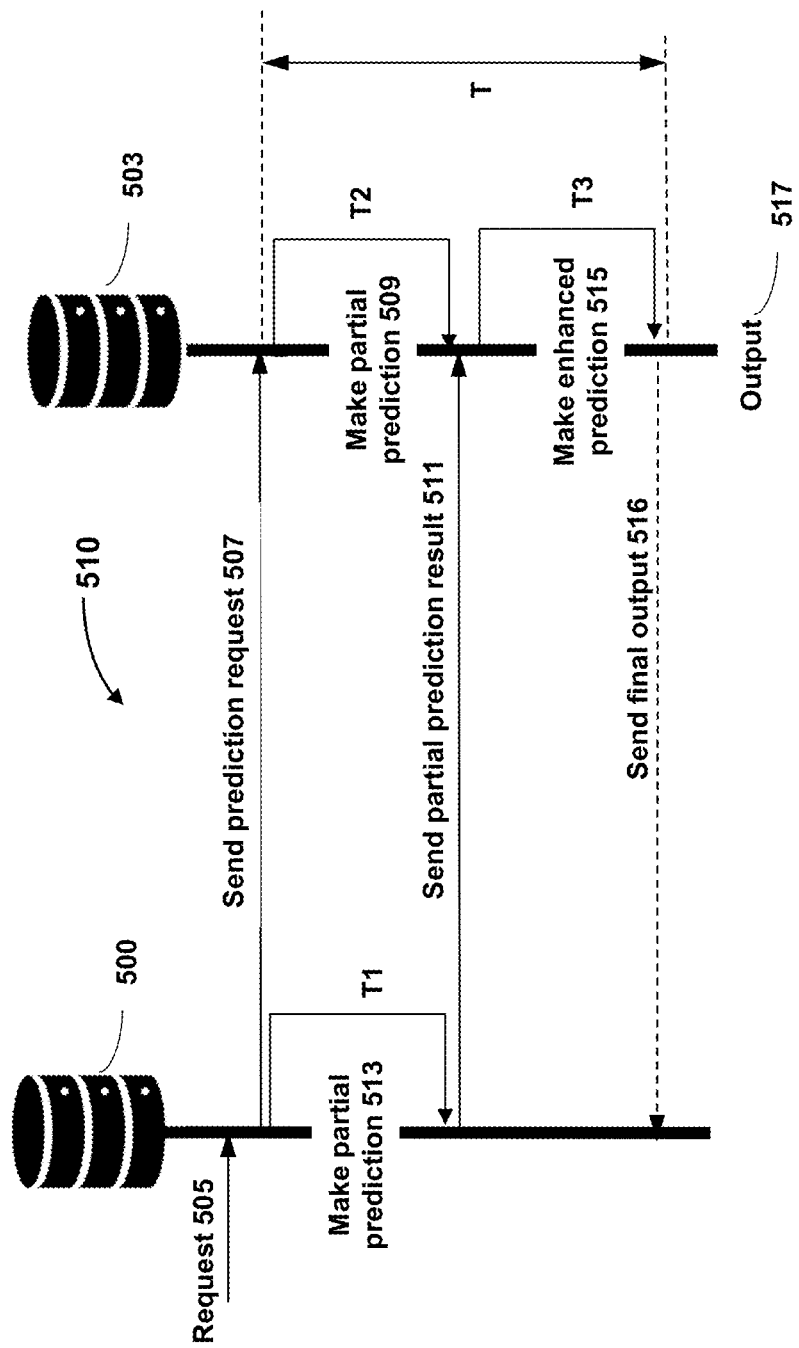

FIG. 5B illustrates an alternative process 510 for making predictions with reduced latency, in accordance with some embodiments of the present disclosure. Similarly, the process may begin with receiving a service request 505 at the provider system 501. The service request may be any service request for making a prediction as described above. Upon receiving the service request, the provider system 501 may send a prediction request 507 to the consumer system 503. The prediction request may include key attributes or features data from the service request such as the bid ID, user ad ID, advertising inventory ID, user location, and publisher name.

In response to receiving the prediction request, the consumer system 503 may make an intermediate prediction or partial prediction 509 using the consumer private data z and features data included in the prediction request (e.g., user ad ID, publisher name, etc.) to output a partial prediction result G($z$). Concurrently with the consumer system making the partial prediction, the provider system 501 may make a partial prediction based on the provider data and features data from the bid request to generate a prediction output m. For example, the provider system 501 may estimate click probability or app installation probability, for a single advertising campaign (single prediction), or multiple advertising campaigns (batch prediction) using (i) the features data from the bid request and (ii) provider's user data. Next, the provider system 501 may send the partial prediction result m to the consumer system 511.

Upon completion of the intermediary prediction and receiving the prediction output m, the consumer system may perform an enhanced prediction 515 to output a final prediction output F(m, $z$) 517. The final output may be generated based on the partial prediction result G($z$) and the prediction output m. In optional cases, the consumer system 511 may return the final output to the provider system 516. The overall prediction time T may approximate the consumer model prediction time (consumer model prediction time-Max (T1, T2)+T3). The overall prediction time is shorter than the sum of the provider model prediction time and consumer model prediction time (e.g., consumer model prediction time+provider model prediction time) as illustrated in FIG. 5B, given that T3 is negligible compared to T1 and T2 when the model function meets the above-mentioned conditions. By performing at least a partial prediction by the consumer model and provider model simultaneously, the overall prediction time for a serialized model system is reduced.

It should be noted that methods and systems of the present disclosure can be applied to any type of machine learning algorithms, architectures or approaches. The provider system and consumer system may use the same machine learning algorithms. The provider system and consumer system may use different machine learning algorithms. The machine learning algorithm can be implemented with any type such as a neural network. Examples of neural networks include a deep neural network, convolutional neural network (CNN), and recurrent neural network (RNN). The machine learning algorithm may comprise one or more of the following: a support vector machine (SVM), a naïve Bayes classification, a linear regression, a quantile regression, a logistic regression, a random forest, a neural network, CNN, RNN, a gradient-boosted classifier or repressor, or another supervised or unsupervised machine learning algorithm (e.g., generative adversarial network (GAN), Cycle-GAN, etc.).

Methods and systems of the present disclosure can be applied to various scenarios. In an example, the provider may be an online advertising company that provides programmatic bidding platform as a cloud service to clients such as game publishers and e-commerce firms. The consumer may include one or more clients, game publishers and e-commerce firms that have proprietary user data that they cannot share with the advertising cloud service provider. The advertising cloud service provider may provide a platform on which the clients (consumer) can set-up and operate advertising campaigns, buy advertising inventories from real-time bidding exchanges using machine learning models, and track the results of advertising campaigns. In such online advertising campaigns, the decisions on how to target proper users and how to price various advertising inventories (advertising impressions) are made by machine learning models that can predict the probabilities of target conversions such as advertising click, product purchase, and application install. Building an accurate machine learning model may require massive amount of data regarding user behaviors and advertising inventories' effectiveness. Because user's response to online advertisements and effectiveness of advertising inventories may be learnt by running (a lot of) ad campaigns, it takes not only time, but a lot of (advertising) spending to acquire such data. To help advertising cloud clients (consumer) overcome this challenge, and to build successful machine learning models and advertising businesses from the beginning, the advertising cloud service provider may provide machine learning predictions as a service. The provider already has massive amount of data and advanced machine learning models for successful online advertising campaigns.

In the training phase, the provider may use provider's proprietary data (and without consumers proprietary data) and machine learning models, to make predictions such as click through rate and purchase rate for an incoming bid request (impression opportunity) for advertising cloud clients' campaigns. Then, the provider's system sends the key attributes of the bid request (i.e., features data) such as the advertising inventory ID, user location, and user ID along with outputs from the provider's machine learning model such as predicted click through rate and/or outputs of the top layer of a deep neural network to the consumer's system. The consumer's system takes the provider's prediction outcomes, and joins it with its proprietary user data, and uses the joined dataset as inputs to the second machine learning model. The second machine learning model's accuracy may be improved over the provider's first machine learning model. The performance of the second machine learning model may be improved over the performance of the provider's machine learning model and the performance of the machine learning model trained using the consumer system's proprietary user data alone. The provider's proprietary data and model design are not visible to the consumer's system, and the consumer's proprietary data and model design are not visible to the provider's system.

The inference process is accelerated and prediction latency is reduced by employing the presented method. For instance, in the inference phase such as real-time bidding online advertising, the provider (e.g., potential ad buyers) may first receive a bid request from Ad exchange. The bid request may include information about the user and advertising inventory such as user's advertising ID, user's geographical location, publisher name, advertising creative format or other features data as described elsewhere herein. In response to receiving the bid request, the provider may send a prediction request to the consumer system. The prediction request may include the features data from the bid request.

In response to receiving the prediction request, the consumer system may make an intermediary prediction about click probability or app install probability using features data included in the prediction request and the consumer system's private user data. Concurrently or simultaneous to the consumer system making the intermediary prediction, the provider's machine learning system may estimate, for example, click probability or app installation probability, for a single advertising campaign (single prediction), or multiple advertising campaigns (batch prediction) using (i) the features data from the bid request and (ii) provider's private user data. The provider system may send the prediction values/partial prediction output such as click probability or app install probability to the consumer system.

Upon receiving the partial prediction output generated by the provider system, the consumer system may make an enhanced prediction on click probability or app install probability using the intermediary prediction result and the provider's prediction outputs. Finally, the consumer system may return the final prediction result to the provider system, which in return submits a bid to the Ad exchange based on the consumer system's final prediction result. The overall prediction latency can be reduced by the provided method. For example, the overall time from the provider system receives the bid request from the Ad exchange to the time the provider system submits a bid may be within 100 milliseconds including network latencies.

Figure 6:
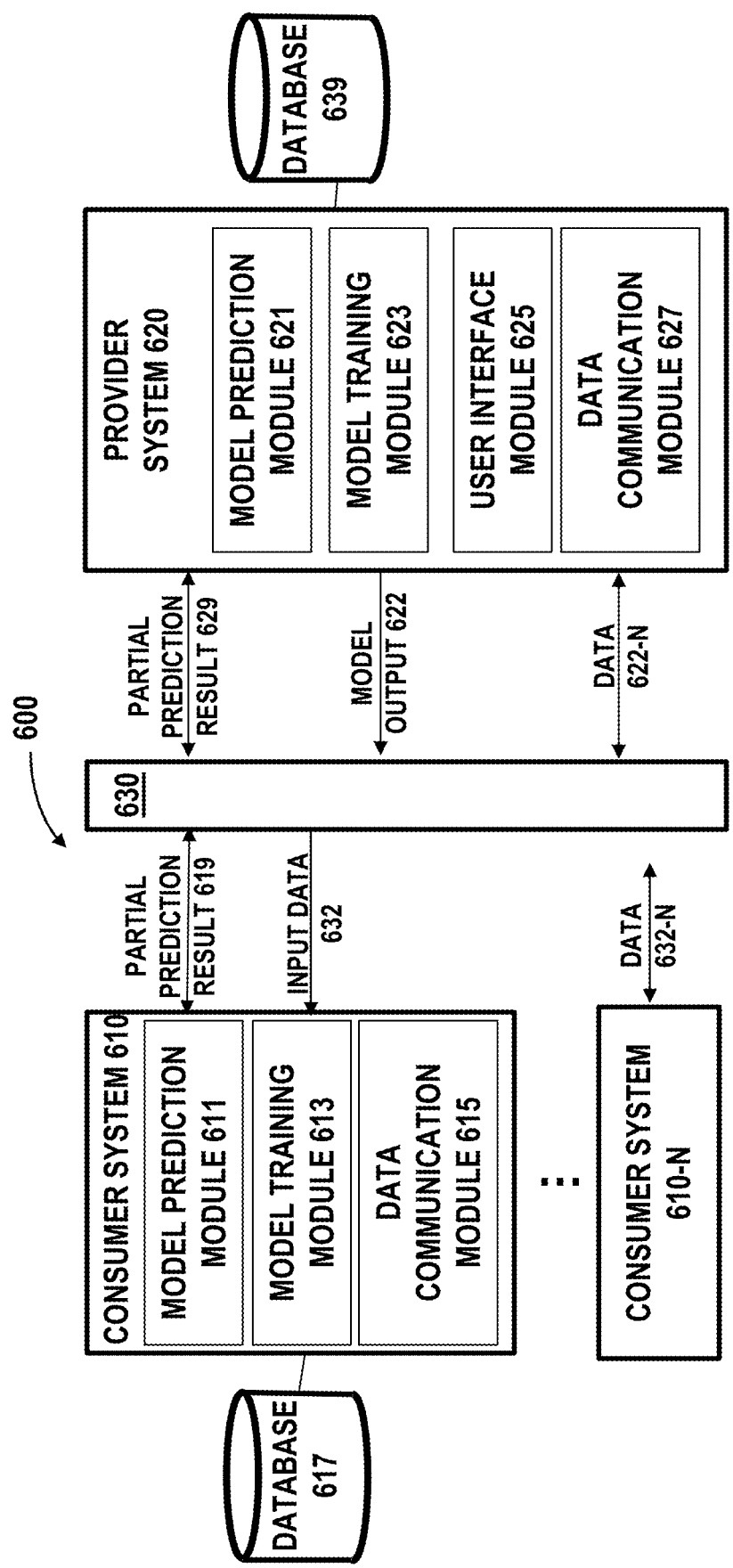
FIG. 6 shows an example of a serialized machine learning system, in accordance with embodiments of the present disclosure.

In some embodiments of the present disclosure, an integration component may be provided to implement a serialized model training system and/or a prediction serving system. FIG. 6 shows an example of an integration component 630 interfacing a consumer system 610 and a provider system 620 in a serialized machine learning system 600. A provider system 620 may provide model output 622, 622-N to one or more consumer systems 610, 610-N via the integration component 630 during a training phase. The model output 622, 622-N provided to the one or more consumer systems 610, 610-N may not be the same. For example, the model output 622, 622-N provided to the one or more consumer systems 610, 610 may be used for training different consumer models. Additionally, the provider system 620 and/or the consumer system 610 may provide intermediary prediction output or partial prediction result 619, 629 to one another via the integration component 630 during the inference phase.

The integration component 630 can be the same as the integration point as described elsewhere herein. In some cases, the integration component 630 may be configured to join the model output 622, 622-N with the consumer private data to form input data 632, 632-N for training the consumer machine learning model and/or making predictions. In some cases, the integration component 630 may be configured to join the partial prediction result 629 with the consumer partial prediction result to form input data for making final/enhanced predictions.

The provider system 620 may comprise multiple components. In some embodiments, the multiple components may include, but not limited to, a model prediction module 621, a model training module 623, a user interface module 625, and a data communication module 627.

The model prediction module 621 may be configured for making predictions using a trained model. In some cases, partial prediction output (e.g., predictions) 629 may be transferred to the consumer system 610 for making inference consistent with the disclosed methods with respect to FIG. 5A and FIG. 5B. For example, when the consumer machine learning model is deployed for making predictions, the model prediction module 621 may run the provider machine learning model to generate partial model output that is to be combined with partial prediction result generated by the consumer system which is further processed by the consumer machine learning model to generate a final output.

The model training module 623 may be configured to train one or more provider machine learning models. The one or more provider machine learning models may be trained based on provider data. The provider data may be stored in a data repository such as a database 639.

The user interface module 625 may be configured to provide a user interface running on a user device. In some cases, a user or consumer may be permitted to select model from a provider model set to obtain model output service. For instance, a user may input requested application field (e.g., click-through-rate prediction), requested data type of the model output or other information for selecting an appropriate provider machine learning model. The user may select the service through a graphical user interface (GUI) and web-based user interface.

A graphical user interface (GUI) is a type of interface that allows users to interact with electronic devices through graphical icons and visual indicators such as secondary notation, as opposed to text-based interfaces, typed command labels or text navigation. The actions in a GUI are usually performed through direct manipulation of the graphical elements. In addition to computers, GUIs can be found in hand-held devices such as MP3 players, portable media players, gaming devices and smaller household, office and industry equipment. The GUIs may be provided in a software, a software application, a web browser, etc. The GUIs may be displayed on a user device or consumer system (e.g., mobile device, personal computers, personal digital assistants, cloud computing system, etc). The GUIs may be provided through a mobile application or web application.

In some cases, the graphical user interface (GUI) or user interface may be provided on a display. The display may or may not be a touchscreen. The display may be a light-emitting diode (LED) screen, organic light-emitting diode (OLED) screen, liquid crystal display (LCD) screen, plasma screen, or any other type of screen. The display may be configured to show a user interface (UI) or a graphical user interface (GUI) rendered through an application (e.g., via an application programming interface (API) executed on the user device or the consumer system, or on the cloud).

The data communication module 627 may be configured to transmit data from the provider system to the consumer system. In some cases, the data communication module may transmit the data based on a set of transmission rules. For example, one or more rules may be set up for serving the model output 622, 622-N. The set of transmission rules may comprise information about transmission frequency, data to be transmitted (e.g., selection of data, volume of data, batch data, stream data, etc), destination of the transmission or others. For example, the frequency of transmitting model output in response to a request may be set up in a transmission rule. Transmission of the model output or data may be performed for each prediction made by the consumer machine learning model or for a pre-determined number of predictions. In another example, the destination where the model output or data to be transmitted to may be set up in a rule (e.g., consumer model ID, consumer system ID/address, etc). The transmission rule may also indicate how the data should be transmitted such as in the form of batch data (e.g., for training) or data stream (e.g., for making prediction). In some cases, the set of transmission rules may be set up automatically by the provider system. Alternatively or in addition to, one or more transmission rules may be set up by a consumer or user such as through the GUI or the web browser running on a user device.

The database 639 may be accessible to the provider system 620. The database 639 may be inaccessible to the consumer system 610. The database 639 may store provider data such as training dataset for training the provider machine learning model (e.g., feature vector, labeled data, etc), model design (e.g., model architecture), model weights (e.g., hyper parameters, weights of the provider machine learning model, etc), input data and output data of a component of the provider model system, historical data (e.g., mobile device Ad ID, name of the publisher etc, conversion result), or code associated with the provider system and various others. In some cases, the database may also store data about the transmission rules as described above.

The consumer system 610 may comprise multiple components. In some embodiments, the multiple components may include, but not limited to, a model prediction module 611, a model training module 613, and a data communication module 615.

The model prediction module 611 may be configured for making predictions using a trained consumer model. During prediction phase, partial prediction output (e.g., predictions) 619 generated by the model prediction module 611 may be transferred to the provider system 620 for making inference consistent with the disclosed methods with respect to FIG. 5A and FIG. 5B. For example, when the consumer machine learning model is deployed for making predictions, the model prediction module 611 may run the consumer machine learning model to generate partial predictions result using the consumer private data, which partial predictions result is to be combined with partial prediction result generated by the provider system which is further processed by the provider machine learning model to generate a final output.

The model training module 613 may be configured to train one or more consumer machine learning models. The one or more consumer machine learning models may be trained based on the data provided by the provider system and the consumer local data as described elsewhere herein. The consumer private or local data may be stored in a data repository such as a database 617.

The consumer system 610 may optionally comprise a data communication module 615. The data communication module 615 may be configured to receive data from the provider system. It should be noted that the data communication module 615 can also be integral to or a part of the integration module 630.

The databases 639, 617, data repository 207, 217 of the system may utilize any suitable database techniques. For instance, structured query language (SQL) or "NoSQL" database may be utilized for storing the query data, training dataset, historical data, predictive model or algorithms. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

The integration component 630 may join the model output 622, 622-N with the consumer private data to form input data 632, 632-N which can be used for training the consumer machine learning model and/for making predictions. The integration component may be configured to join the data using methods as described above. For example, during training phase, data provided by the provider system may be joined with selected consumer input features. The integration component 630 may be configured to select one or more consumer input features to be joined with the data transferred from the provider system. In some cases, these data may be joined by common feature identifiers (IDs). For instance, common feature IDs such as mobile device advertising (Ad) ID and publisher name may be used for joining the consumer input features data and the training sample data provided by the provider system. For example, in click-through rate (ctr) prediction, one sample dataset transferred from the provider system may comprise: (i) mobile device Ad ID, (ii) name of the publisher where the Ad impression was made (iii) provider model's predicted ctr and (iv) a conversion result (e.g., user clicked or not, website conversion rate, etc). In some cases, for each sample dataset, the selected consumer input features (e.g., the products that each mobile Ad ID are purchased from, an e-commerce app using the mobile Ad IDs) may be appended to the sample dataset to create the consumer's training dataset. For example, the private feature and the (iii) provider model's predicted ctr may form the input features, and the (iv) conversion result transferred from the provider system may be used as the labeled data to train the consumer machine learning model.

It is noted that although the integration component is shown as a standalone component interfacing both the provider system and the consumer system, the integration component can be part of the provider system and/or the consumer system.

The integration component, consumer system, provider system, components of the consumer system or provider system may be implemented in software, hardware, firmware, embedded hardware, standalone hardware, application specific-hardware, or any combination of these. The integration component, provider system and its components, consumer system and its components, and techniques described herein may be realized in digital electronic circuitry, integrated circuitry, specially designed ASICs (application specific integrated circuits), computer hardware, firmware, software, and/or combinations thereof. These systems, devices, and techniques may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, and/or device (such as magnetic discs, optical disks, memory, or Programmable Logic Devices (PLDs)) used to provide machine instructions and/or data to a programmable processor.

In some cases, one or more functions or operations consist with the methods described herein can be provided as software application that can be deployed as a cloud service, such as in a web services model. A cloud-computing resource may be a physical or virtual computing resource (e.g., virtual machine). In some embodiments, the cloud-computing resource is a storage resource (e.g., Storage Area Network (SAN), Network File System (NFS), or Amazon S3®), a network resource (e.g., firewall, load-balancer, or proxy server), an internal private resource, an external private resource, a secure public resource, an infrastructure-as-a-service (IaaS) resource, a platform-as-a-service (PaaS) resource, or a software-as-a-service (SaaS) resource. Hence, in some embodiments, a cloud-computing service provided may comprise an IaaS, PaaS, or SaaS provided by private or commercial (e.g., public) cloud service providers.

Computer Systems

Figure 7:
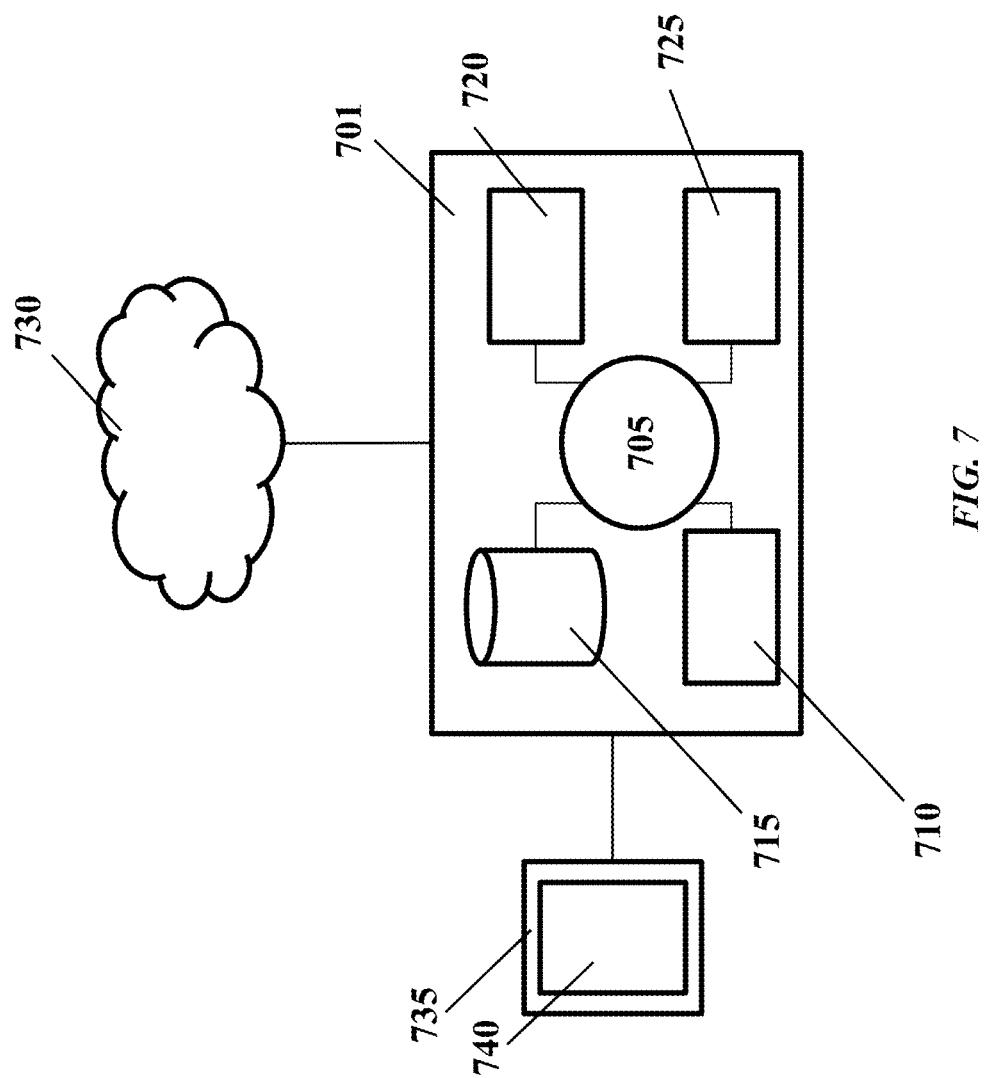
FIG. 7 shows a computer system that is programmed or otherwise configured to implement the serialized machine learning system.

The provider system, consumer system, integration component, or processes described herein can be implemented by one or more processors. In some embodiments, the one or more processors may be a programmable processor (e.g., a central processing unit (CPU), a graphic processing unit (GPU), a general-purpose processing unit or a microcontroller), in the form of fine-grained spatial architectures such as a field programmable gate array (FPGA), an application-specific integrated circuit (ASIC), and/or one or more Advanced RISC Machine (ARM) processors. In some embodiments, the processor may be a processing unit of a computer system. FIG. 7 shows a computer system 701 that is programmed or otherwise configured to implement the serialized machine learning system. The computer system 701 can regulate various aspects of the present disclosure.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user (e.g., a user device). Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740 for providing, for example, a graphical user interface as described elsewhere herein. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, trained models such as predictive model.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for reducing prediction latency and maintaining data privacy in a serialized machine learning system, the method comprising:
   (I) during an inference stage, running partial inferences by a first trained machine learning model and a second trained machine learning model concurrently, wherein running the partial inferences comprises:
      (a) a first computing system making a first intermediary inference using the first trained machine learning model by taking in an input data comprising (i) a first set of data accessible to the first computing system and (ii) data in a request, wherein an inference time for making the first intermediary inference by the first trained machine learning model is T1;
      (b) concurrently with (a) and during the same inference stage, a second computing system making a second intermediary inference using the second trained machine learning model, wherein the second intermediary prediction is generated by taking in an input data comprising (i) a second set of data and (ii) the data in the request, and wherein an inference time for making the second intermediary inference by the second trained machine learning model is T2; and
   (II) during the same inference stage, upon determining T1>T2, transmitting the second intermediary inference from the second computing system to the first computing system and joining, by an integration point, the first intermediary inference and the second intermediary inference based at least in part on a common feature identifier in the data of the request for the first trained machine learning model to make a final inference, wherein an inference time for making the final inference by the first trained machine learning model is T3 and wherein the overall inference time is T1+T3 which is shorter than the sum of T1 and T2 thereby reducing prediction latency or,
   upon determining T1<T2, transmitting the first intermediary inference from the first computing system to the second computing system and joining, by the integration point, the first intermediary inference and the second intermediary inference based at least in part on the common feature identifier in the data of the request for the second trained machine learning model to make a final inference, and wherein the overall inference time is T2+T3 which is shorter than the sum of T1 and T2 thereby reducing prediction latency,
   wherein model weights of the first trained machine learning model and the first set of data are secured on the first computing system and isolated from the second computing system and wherein model weights of the second trained machine learning model and the second set of data are secured on the second computing system and isolated from the first computing system to preserve privacy of the first set of data and the second set of data, and the model weights of the first trained machine learning model and the second trained machine learning model respectively.

2. The method of claim 1, wherein the request is for performing a prediction and wherein the request is received by the first computing system.

3. The method of claim 1, wherein the second computing system makes the second intermediary inference in response to a prediction request transmitted from the first computing system, and wherein the prediction request includes the data in the request.

4. The method of claim 1, wherein during a training stage, model weights of the second machine learning model are optimized using supervised learning and wherein a labeled dataset for training the second machine learning model comprises model output data generated by the first trained machine learning model.

5. The method of claim 4, wherein the first trained machine learning model is a neural network.

6. The method of claim 5, wherein the model output data generate by the first trained machine learning model comprises output of a top layer of the neural network.

7. The method of claim 5, wherein the model output data generate by the first trained machine learning model comprises a prediction value.

8. The method of claim 1, wherein a model output function of the first trained machine learning model or the second trained machine learning model is a simple arithmetic transformation.

9. The method of claim 1, wherein T3 is shorter than T1 or T2.

10. A serialized machine learning system comprising:
   (a) a first computing system comprising a processor and a first trained machine learning model, wherein the first computing system is configured to, during an inference stage, make a first intermediary inference using the first trained machine learning model based on (i) a first set of data accessible to the first computing system and (ii) data in a request, wherein an inference time for making the first intermediary inference is T1;
   (b) a second computing system comprising a processor and a second trained machine learning model, wherein the second computing system is configured to, during the same inference stage, make a second intermediary inference concurrently with the first computing system making the first intermediary inference, and wherein the second intermediary inference is made using the second trained machine learning model based on (i) a second set of data and (ii) the data in the request, and wherein an inference time for making the second intermediary inference is T2; and
   (c) an integration component configured to:
      during the same inference stage, upon determining T1>T2, transmit the second intermediary inference from the second computing system to the first computing system and join the first intermediary inference and the second intermediary inference based at least in part on a common feature identifier in the data of the request for the first trained machine learning model to make a final inference, wherein an inference time for making the final inference by the first trained machine learning model is T3 and wherein the overall inference time is T1+T3 which is shorter than the sum of T1 and T2 thereby reducing prediction latency, or upon determining T1<T2, transmit the first intermediary inference from the first computing system to the second computing system and join the first intermediary inference and the second intermediary inference based at least in part on a common feature identifier in the data of the request for the second trained machine learning model to make a final inference, and wherein the overall inference time is T2+T3 which is shorter than the sum of T1 and T2 thereby reducing prediction latency, wherein the first trained machine learning model and the first set of data are secured on the first computing system and isolated from the second computing system and wherein the second machine learning model and the second set of data are secured on the second computing system and isolated from the first computing system to preserve privacy of the first set of data and the second set of data respectively.

11. The serialized machine learning system of claim 10, wherein the request is for performing a prediction and wherein the request is received by the first computing system.

12. The serialized machine learning system of claim 10, wherein the first computing system is configured to further send a prediction request to the second computing system, and wherein the second computing system makes the second intermediary inference in response to receiving the prediction request.

13. The serialized machine learning system of claim 10, wherein during a training stage, model weights of the second machine learning model are optimized using supervised learning and wherein a labeled dataset for training the second machine learning model comprises model output data generated by the first trained machine learning model.

14. The serialized machine learning system of claim 13, wherein the first trained machine learning model is a neural network.

15. The serialized machine learning system of claim 14, wherein the model output data generate by the first trained machine learning model comprises output of a top layer of the neural network.

16. The serialized machine learning system of claim 14, wherein the model output data generate by the first trained machine learning model comprises a prediction value.

17. The serialized machine learning system of claim 10, wherein a model output function of the first trained machine learning model or the second trained machine learning model is a simple arithmetic transformation.

18. The serialized machine learning system of claim 10, wherein T3 is shorter than T1 or T2.

* * * * *